(12) United States Patent
Rowe et al.

(10) Patent No.: US 10,746,206 B1
(45) Date of Patent: Aug. 18, 2020

(54) SOFT-BODIED FLUIDIC ACTUATOR

(71) Applicant: Toyota Motor Engineering & Manufacturing North America, Inc., Plano, TX (US)

(72) Inventors: Michael Paul Rowe, Pinckney, MI (US); Jillian M. Jakubiec, Bloomfield Hills, MI (US)

(73) Assignee: Toyota Motor Engineering & Manufacturing North America, Inc., Planto, TX (US)

( * ) Notice: Subject to any disclaimer, the term of this patent is extended or adjusted under 35 U.S.C. 154(b) by 8 days.

(21) Appl. No.: 16/269,695

(22) Filed: Feb. 7, 2019

(51) Int. Cl.
  *F15B 21/06* (2006.01)
  *F15B 15/10* (2006.01)
  *H02N 1/00* (2006.01)

(52) U.S. Cl.
  CPC ............ *F15B 21/065* (2013.01); *F15B 15/10* (2013.01); *H02N 1/00* (2013.01); *H02N 1/002* (2013.01); *H02N 1/004* (2013.01); *H02N 1/006* (2013.01)

(58) Field of Classification Search
  CPC ......... F15B 21/065; F15B 15/10; H02N 1/00; H02N 1/002; H02N 1/004; H02N 1/006
  USPC ....................................... 92/89, 90; 310/309
  See application file for complete search history.

(56) References Cited

U.S. PATENT DOCUMENTS

| | | | | |
|---|---|---|---|---|
| 2,667,786 | A * | 2/1954 | Spaulding | G01L 9/0072 73/724 |
| 5,580,251 | A | 12/1996 | Gilkes et al. | |
| 6,359,757 | B1 * | 3/2002 | Mallary | G11B 5/5552 137/1 |
| 6,938,310 | B2 * | 9/2005 | Hawkins | B41J 2/14314 216/27 |
| 8,979,511 | B2 * | 3/2015 | Anex | F04B 19/006 417/322 |
| 2008/0048520 | A1 * | 2/2008 | Gulvin | H01G 5/18 310/309 |

(Continued)

FOREIGN PATENT DOCUMENTS

JP   2005279784 A   10/2005

OTHER PUBLICATIONS

Acome, et al. "Hydraulically amplified self-healing electrostatic actuators with muscle-like performance" Science Jan. 5, 2018: vol. 359, Issue 6371, pp. 61-65.

*Primary Examiner* — Hoang M Nguyen

(74) *Attorney, Agent, or Firm* — Chrisopher G. Darrow; Darrow Mustafa PC

(57) ABSTRACT

An actuator includes a first enclosure, a dielectric fluid in the first enclosure, and a second enclosure in fluid communication with the first enclosure. An elastic membrane defines at least a portion of the second enclosure. A first electrical conductor is positioned along a first side of the first enclosure. A second electrical conductor is positioned along a second side of the first enclosure opposite the first side. The second conductor is spaced apart from the first conductor. The conductors are connected to a power source. Application of electrical energy to the first and second conductors produces an attractive force between the conductors. Motion of the conductors toward each other pressurizes the dielectric fluid so as to force the dielectric fluid to flow from the first enclosure into the second enclosure. The flow of the dielectric fluid exerts a force on the elastic membrane which expands the elastic membrane.

20 Claims, 10 Drawing Sheets

(56) References Cited

U.S. PATENT DOCUMENTS

2008/0123171 A1\* 5/2008 Dausch ............... F16K 99/0001
                                                     359/230
2009/0129952 A1   5/2009 Patrascu et al.

\* cited by examiner

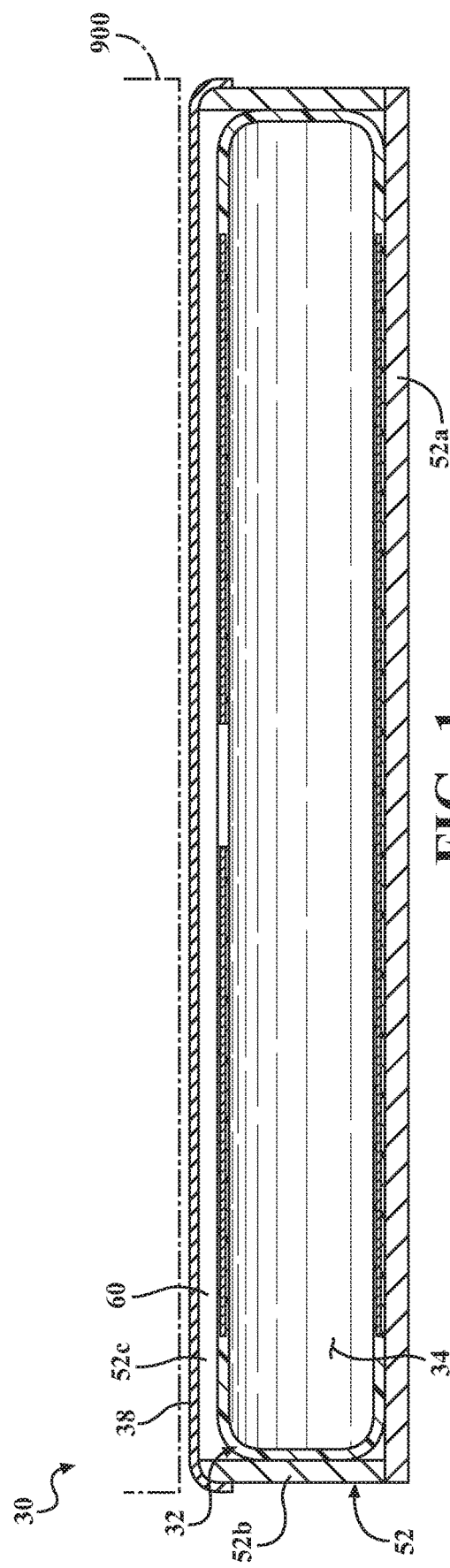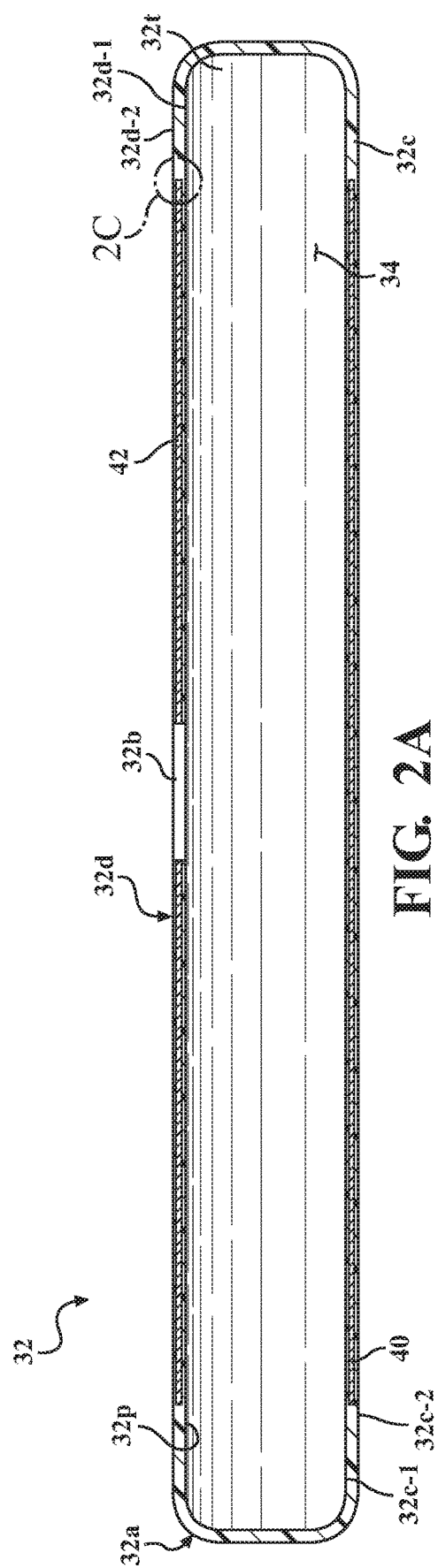

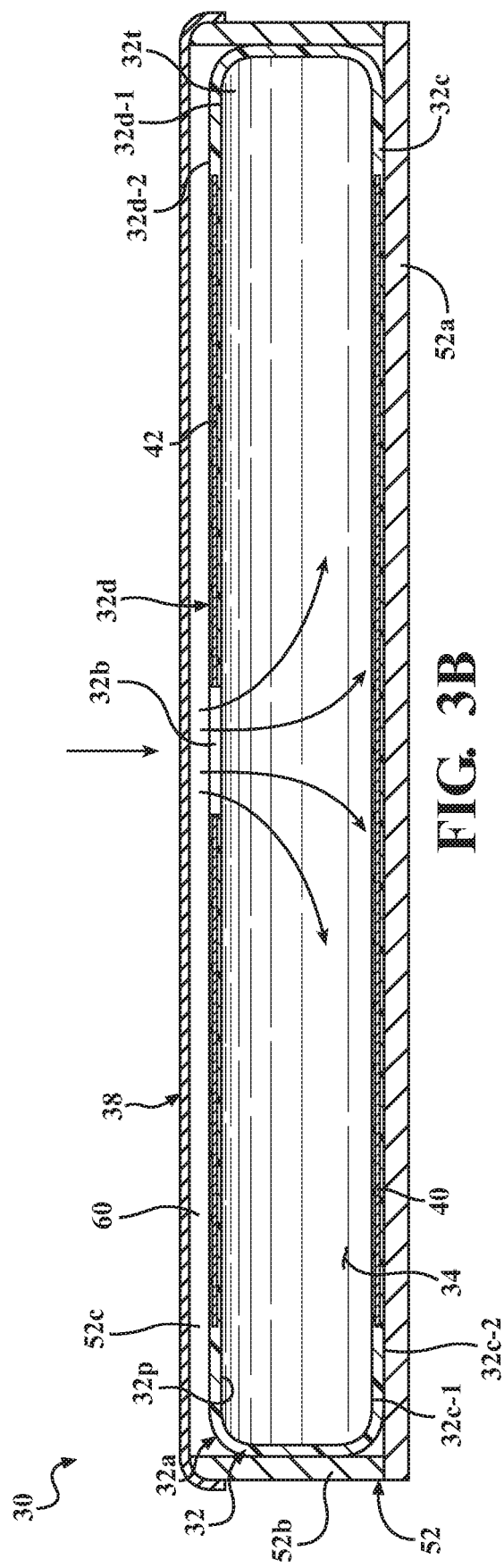
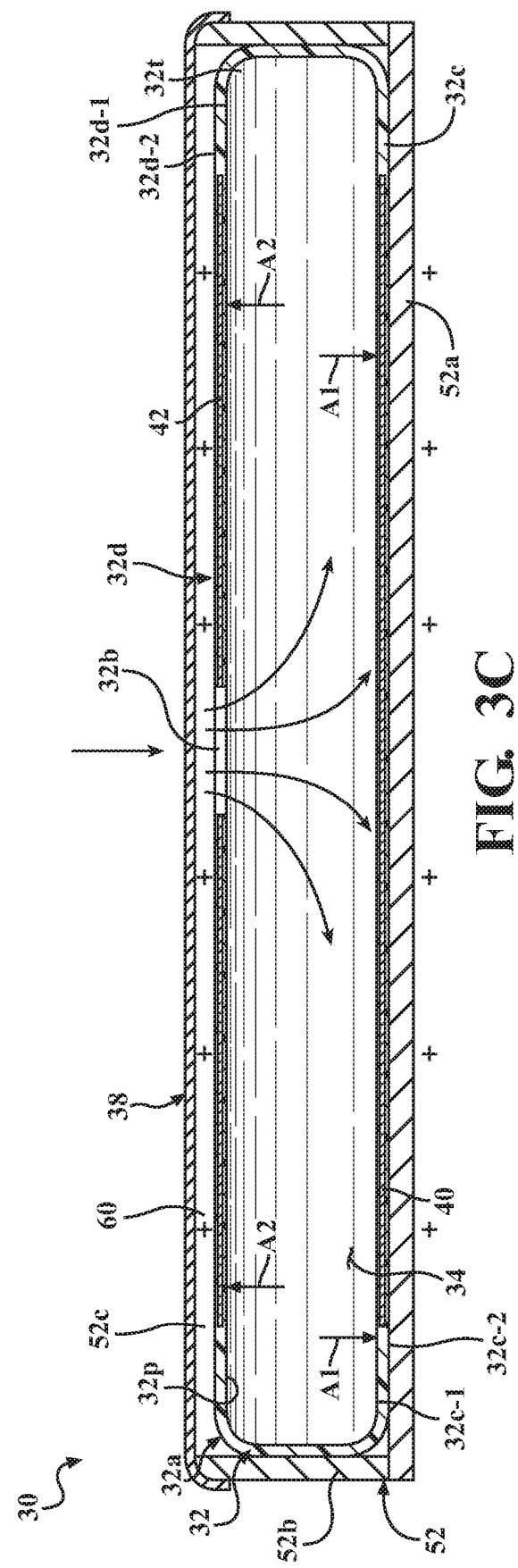
FIG. 3B
FIG. 3C

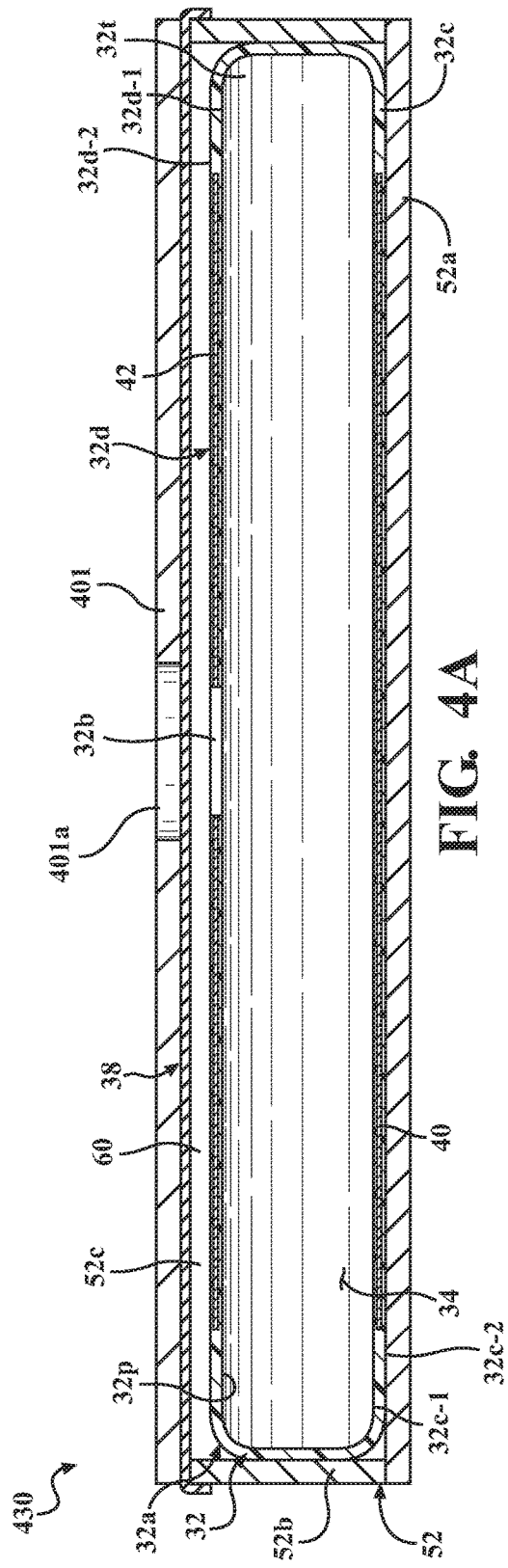
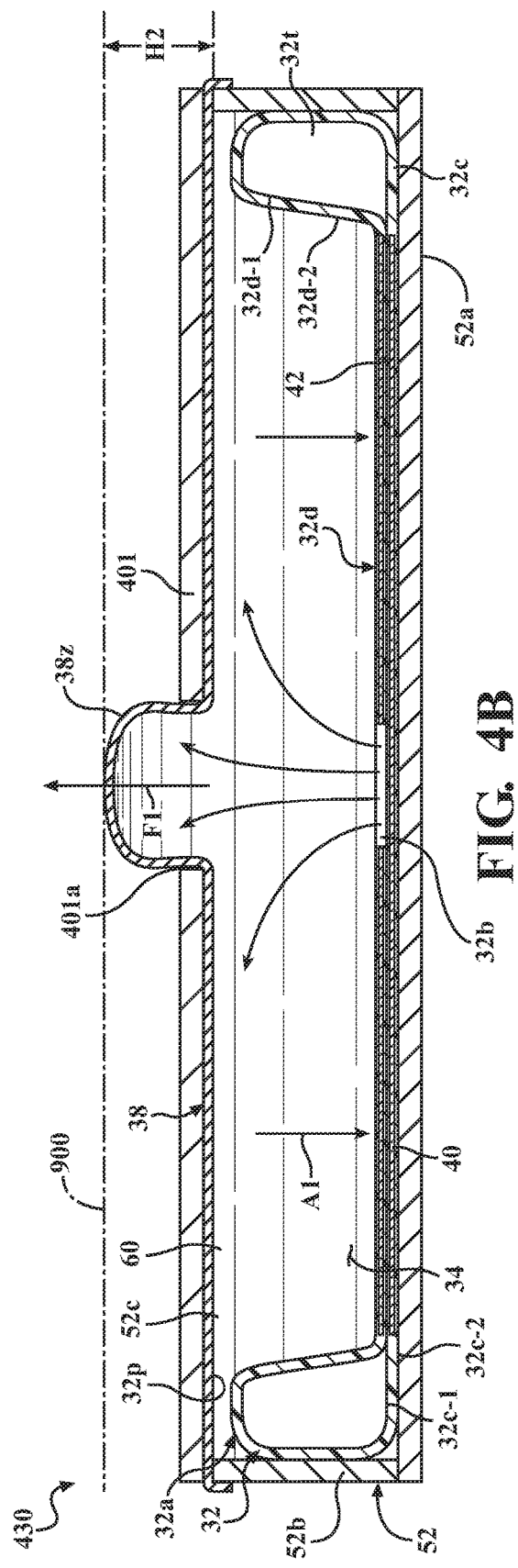

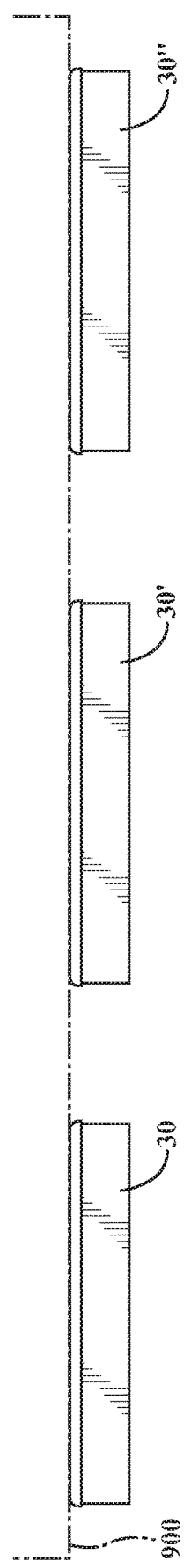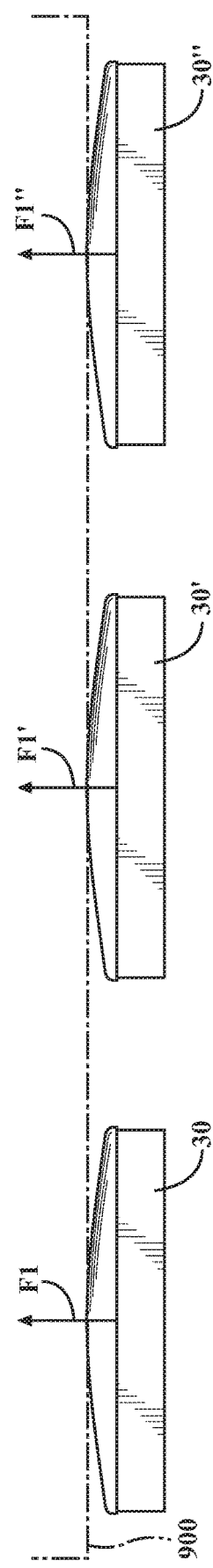

SOFT-BODIED FLUIDIC ACTUATOR

TECHNICAL FIELD

The subject matter described herein relates in general to actuators and, more particularly, to soft-bodied actuators.

BACKGROUND

Actuators are used in a wide-variety of applications for interacting with and/or controlling another component or system. There are various types of actuators, including hydraulic actuators, pneumatic actuators, electric, and mechanical actuators. Many actuators in the past have been made of rigid materials or include rigid structures. However, there have been new advancements in the field of soft-bodied actuators. One example of a recent development relates to what is being referred to as hydraulically or fluidically-amplified self-healing electrostatic actuators.

SUMMARY OF THE INVENTION

In one aspect of the embodiments described herein, an actuator is provided. The actuator includes a first enclosure, a dielectric fluid positioned in the first enclosure, and a second enclosure in fluid communication with the first enclosure. An elastic membrane defines at least a portion of the second enclosure. A first electrical conductor is positioned along a first side of the first enclosure. A second electrical conductor is positioned along a second side of the first enclosure opposite the first side. The second conductor is spaced apart from the first conductor. The first conductor and the second conductor are configured to receive electrical energy from a power source. The actuator is configured such that a first application of electrical energy to the first and second conductors produces an attractive force between the first conductor and the second conductor, drawing the first conductor and the second conductor toward each other. The actuator is also configured such that motion of the first conductor and the second conductor toward each other pressurizes the dielectric fluid in the first enclosure so as to force the dielectric fluid to flow from the first enclosure into the second enclosure. The flow of the dielectric fluid into the second enclosure exerts a force on the elastic membrane which expands the elastic membrane.

In another aspect of the embodiments described herein, a system is provided. The system includes at least one actuator having a first enclosure, a dielectric fluid positioned in the first enclosure, and a second enclosure in fluid communication with the first enclosure. An elastic membrane defines at least a portion of the second enclosure. A first electrical conductor is positioned along a first side of the first enclosure. A second electrical conductor is positioned along a second side of the first enclosure opposite the first side and spaced apart from the first conductor. The first conductor and the second conductor are configured to receive electrical energy from a power source. A power source is operatively connected to supply electrical energy to first conductor and the second conductor. One or more processors are operatively connected to selectively control the supply of electrical energy from the power source to the actuator. The actuator is configured such that a first application of electrical energy to the first and second conductors produces an attractive force between the first conductor and the second conductor, drawing the first conductor and the second conductor toward each other. Motion of the first conductor and the second conductor toward each other pressurizes the dielectric fluid in the first enclosure so as to force the dielectric fluid to flow from the first enclosure into the second enclosure. The flow of the dielectric fluid into the second enclosure exerts a force on the elastic membrane which expands the elastic membrane.

BRIEF DESCRIPTION OF THE DRAWINGS

The accompanying drawings, which are incorporated in and constitute a part of this specification, illustrate embodiments described herein and together with the description serve to explain principles of embodiments described herein.

FIG. 1 is a schematic cross-sectional view of an actuator in accordance with an embodiment described herein, shown in an unactivated mode.

FIG. 2A is a schematic cross-sectional view of a flexible bladder which may be incorporated into an actuator in accordance with an embodiment described herein, shown in a mode in which the actuator is unactivated.

FIG. 3B is the schematic cross-sectional view of FIG. 3A, showing the actuator after deactivation following the state shown in FIG. 3A.

FIG. 3C is the schematic cross-sectional view of FIG. 3A showing the actuator in an alternative mode after deactivation following the state shown in FIG. 3A.

FIG. 4A is a schematic cross-sectional view of an actuator in accordance with another embodiment described herein, in an unactivated mode.

FIG. 4B is the schematic cross-sectional view of FIG. 4A showing the actuator in an activated mode.

FIG. 8A is a schematic side view of an actuatable surface comprising actuators as shown in FIGS. 3A-3C, before activation of the actuator.

FIG. 8B is the schematic side view of FIG. 8A showing the actuators after activation, with each actuator applying an associated force to an object.

DETAILED DESCRIPTION

Figure 2B:
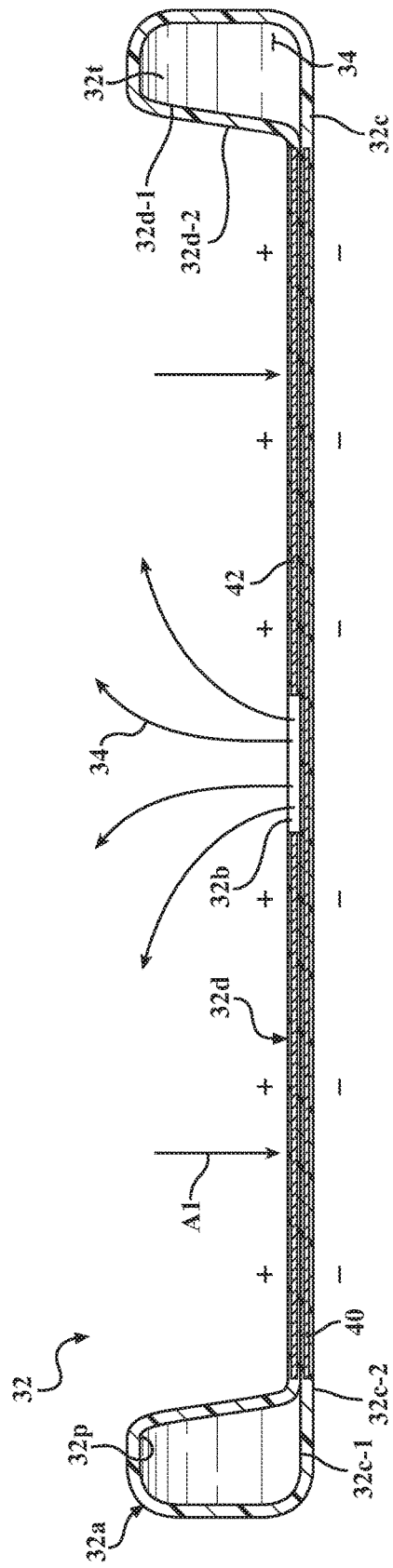
FIG. 2B is the schematic cross-sectional view of FIG. 2A, shown in a mode in which the actuator is activated.

In one or more arrangements described herein, an actuator includes a first enclosure, a dielectric fluid positioned in the first enclosure, and a second enclosure in fluid communication with the first enclosure. An elastic membrane defines at least a portion of the second enclosure. A first electrical conductor is positioned along a first side of the first enclosure. A second electrical conductor is positioned along a second side of the first enclosure opposite the first side and spaced apart from the first conductor. The first conductor and the second conductor are configured to receive electrical energy from a power source. The actuator is configured such that a first application of electrical energy to the first and second conductors produces an attractive force between the first conductor and the second conductor, drawing the first conductor and the second conductor toward each other. Motion of the first conductor and the second conductor toward each other pressurizes the dielectric fluid in the first enclosure so as to force the dielectric fluid to flow from the first enclosure into the second enclosure. The flow of the dielectric fluid into the second enclosure exerts a force on the elastic membrane which expands the elastic membrane. This force can be directed externally outwardly from the actuator, for use in moving an object in contact with the elastic membrane, for example.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-10B, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of an actuator 30 is shown. The actuator 30 can have any suitable size and/or shape. In one or more arrangements, the actuator 30 can have a substantially rectangular shape overall with a substantially rectangular cross sectional shape, such as is shown in FIG. 1. It will be understood that other shapes are possible. As used herein, the term "substantially" includes exactly the term it modifies and slight variations therefrom. Thus, the term "substantially rectangular" means exactly rectangular and slight variations therefrom. In this particular example, slight variations therefrom can include within normal manufacturing tolerances for the dimensions and materials used in fabricating the actuator 30. In one or more arrangements, the normal manufacturing tolerances may be within about 10 degrees/percent or less, within about 5 degrees/percent or less, within about 4 degrees/percent or less, within about 3 degrees/percent or less, within about 2 degrees/percent or less, or within about 1 degrees/percent or less.

Actuator 30 may include a first enclosure 32. FIGS. 2A-2B show the structure and operation of one embodiment of the first enclosure 32 which may be incorporated into the actuator of FIG. 1. An "enclosure" for purposes described herein may be defined as a volume of space defined by a boundary and including the boundary.

Referring to FIG. 1, the first enclosure 32 may be in the form of a bladder having a casing 32a formed from a soft, flexible, fluid-impermeable, electrically insulating material. The bladder casing 32a may define an interior 32t of the first enclosure 32. The bladder 32 may have a first wall 32c defining a first side of the first enclosure 32. The bladder 32 may also have a second wall 32d positioned opposite the first wall 32c and defining a second side of the first enclosure 32.

The bladder 32 may have at least one opening 32b formed therein. The at least one opening 32b may enable fluid communication between the interior 32t of the first enclosure 32 and an exterior of the first enclosure. In arrangements described herein, the at least one opening 32b may enable fluid communication between the first enclosure 32 and a second enclosure 60 (described in greater detail below). In one or more arrangements, the at least one opening 32b is formed in the bladder second wall 32d, as shown in FIGS. 2A-2B.

The material(s) from which the electrically-insulative bladder casing may be formed can include a polymer, an elastomeric polymer (elastomer) or both. Any of a plurality of different elastomers and/or polymers of varying degrees of softness and hardness can be employed. Polymers used in the implementations described herein can further include the addition of a plasticizer, such as a phthalate ester, for example. The polymers or elastomers may be natural or synthetic. Examples of elastomers usable as part of the bladder casing can include an insulating elastomer, such as nitrile, ethylene propylene diene monomer (EPDM), fluorosilicone (FVMQ), vinylidene fluoride (VDF), hexafluoropropylene (HFP), tetrafluoroethylene (TFE), perfluoromethylvinylether (PMVE), polydimethylsiloxane (PDMS), natural rubber, neoprene, polyurethane, silicone, silicone rubber, or combinations thereof. The bladder casing materials can be described and/or specified with regard to electrical properties of the materials, such as dielectric constant, electric breakdown voltage, electrical conductivity, and other properties. The terms "elastomer" and "elastomeric material", as used herein, refer to a material which can be stretched by an external force at room temperature to at least twice its original length, and then upon release of the external force, can immediately return to its original length. Room temperature can generally refer to a temperature in a range of from about 20° C. to about 25° C. Elastomers, as used herein, can include a thermoplastic, and may be cross-linked or thermoset.

Figure 2C:
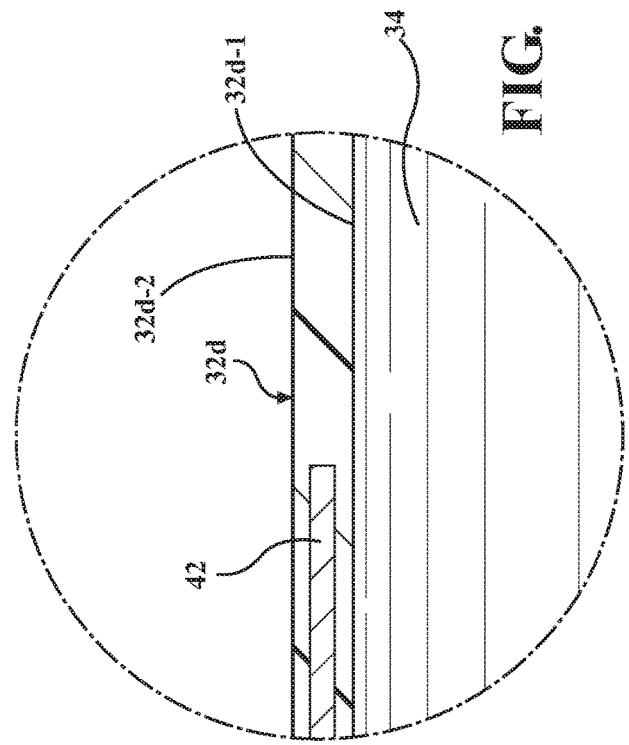
FIG. 2C is a magnified view of a portion of the cross-section shown in FIG. 2A.

FIG. 2C is a magnified view of a portion of the cross-section shown in FIG. 2A. FIG. 2C shows a portion of a second electrical conductor 42 (described below) or electrode which is embedded or otherwise contained within enclosure second wall 32d as described herein. A first electrical conductor 40 is embedded or contained within enclosure first wall 32c in a similar manner to form a first electrode.

Referring to FIGS. 2A and 2B, first electrical conductor 40 may be operatively connected to the casing 32a along the first wall 32c of the first enclosure 32. Second electrical conductor 42 may be operatively connected to the casing 32*a* along the second wall 32*d* of the first enclosure 32 opposite the first wall 32*c* and spaced apart from the first conductor 40. The second electrical conductor 42 may be positioned to reside directly opposite the first electrical conductor 40, with a dielectric fluid 34 contained within the bladder 32 between the first and second conductors 40, 42. The term "operatively connected," as used throughout this description, can include direct or indirect connections, including connections without direct physical contact.

In one or more arrangements described herein, the opening 32*b* may extend through the second conductor 42 as shown in FIGS. 2A-2B. Alternatively, the opening 32*b* may be positioned to one side of the second conductor 42, adjacent the second conductor. The first conductor 40 and the second conductor 42 may be configured to receive electrical energy from a power source (not shown), such as a conventional power supply or other voltage source.

The conductors 40, 42 may be configured to be flexible or malleable to conform to deformations and forces applied to the bladder 32. The conductors 40, 42 may be capable of deforming or deflecting without compromising mechanical or electrical performance. Electrical conductors 40, 42 may include one or more suitable electrically-conductive metals and/or metal alloys, including materials such as copper, aluminum, tin, gold, and/or any other suitable materials.

In certain implementations, one or more of the conductors 40, 42 may include a hydrogel material. The conductors 40, 42 can further include a polymer, an elastomeric polymer (such as a conductive elastomer) or both. Examples of elastomers usable as part of the conductors 40, 42 can include nitrile, EPDM, fluorosilicone (FVMQ), vinylidene fluoride (VDF), hexafluoropropylene (HFP), tetrafluoroethylene (TFE), perfluoromethylvinylether (PMVE), polydimethylsiloxane (PDMS), natural rubber, neoprene, polyurethane, silicone, or combinations thereof.

In certain implementations, the conductors 40, 42 can be composed or further include an electrically-conductive dopant material, such as silver, gold, platinum, copper, aluminum, or others. For example, in one or more arrangements, the conductors 40, 42 can be made of natural rubber with carbon or other conductive particles distributed throughout the material. In further implementations, the conductors 40, 42 can include inks and adhesives, for the purpose of affecting characteristics such as conductor flexibility and/or conductivity in a desired manner.

The conductors 40, 42 can be made of the same materials as each other, or the conductors 40, 42 can be made of different materials. One or more of the conductors 40, 42 can be formed by a single, continuous structure, or one or more of the conductors 40, 42 can be formed by a plurality of separate structures.

The conductors 40, 42 may be structured (according to constituent material, application processes, etc.) to be as thin as practical while providing a sufficient level of mechanical robustness. In one or more arrangements, the conductors 40, 42 may be formed from aluminum having thicknesses in the range of 2-100 micrometers inclusive. In particular arrangements, the conductors may have thicknesses in the range 4-6 micrometers inclusive. In more particular arrangements, the conductors may have thicknesses of about 5 micrometers inclusive.

The first conductor 40 and/or the second conductor 42 may extend along all of or a portion of a respective side or portion of the casing 32*a*. In addition, the first conductor 40 and the second conductor 42 can be operatively connected to the casing 32*a* in any suitable manner.

Referring to FIGS. 2A and 2B, in one or more arrangements, either (or both) of conductors 40 and 42 may be positioned within respective walls of the first enclosure and may be spaced apart or recessed from outer surfaces of respective walls of the first enclosure. For example, the first conductor 40 may be spaced apart or recessed from an interior surface 32*c*-1 of the first enclosure first wall 32*c* and spaced apart from an exterior surface 32*c*-2 of the first enclosure first wall 32*c*. In addition, the second conductor 42 may be spaced apart from an interior surface 32*d*-1 of the first enclosure second wall 32*d* and spaced apart from an exterior surface 32*d*-2 of the first enclosure second wall 32*d*.

The portion of the casing 32*a* residing between the first wall interior surface 32*c*-1 and the first conductor 40 may form part of a first insulating layer positioned to prevent direct physical contact between the first electrical conductor 40 and the second electrical conductor 42. Similarly, the portion of the casing 32*a* residing between the second wall interior surface 32*d*-1 and the second conductor 42 may form part of another first insulating layer positioned to prevent direct physical contact between the first electrical conductor 40 and the second electrical conductor 42.

Also, the portion of the casing 32*a* residing between the exterior surface 32*c*-2 and the first conductor 40 may form part of a second insulating layer positioned to prevent direct physical contact between the first electrical conductor 40 and an exterior of the first enclosure. Similarly, the portion of the casing residing between the exterior surface 32*d*-2 and the second conductor 42 may form part of another second insulating layer positioned to prevent direct physical contact between the second electrical conductor 42 and the exterior of the first enclosure.

In one example, each of conductor(s) 40, 42 may be recessed within a respective thickness of the first enclosure first wall 32*c* or second wall 32*d* by providing a layer of an epoxy or other flowable, insulative base material in a liquid or other form into which the conductor(s) may be immersed to a certain depth, so that the conductor is spaced apart from outer surfaces of the layer of base material layer. The base material may then be hardened or dried, thereby encapsulating the conductor(s) within the thickness of the material layer. The base material layer with the conductor embedded therein may then form a wall of the first enclosure. In this embodiment, the side of the enclosure containing the conductor may be formed from a single material. Other fabrication methods may also be used.

Figure 2D:
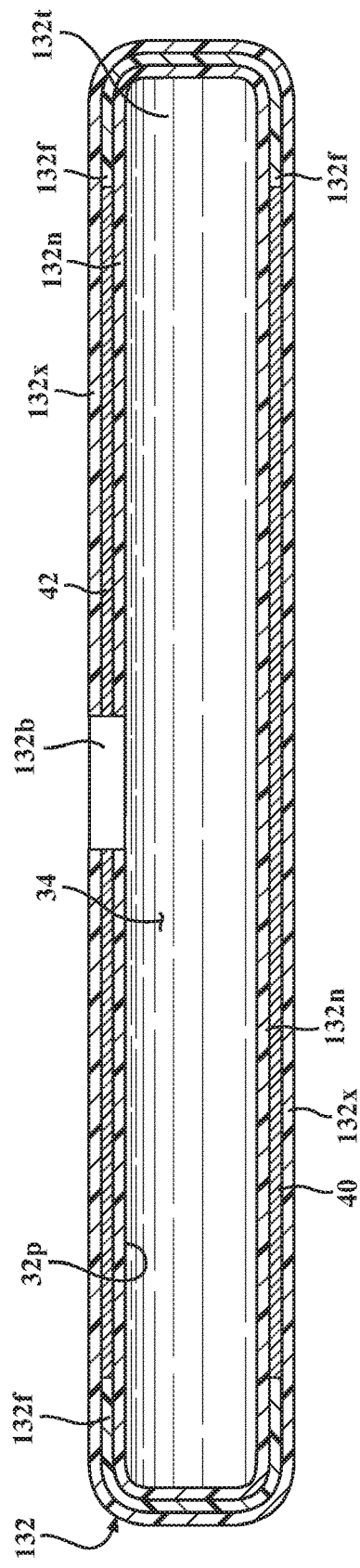
FIG. 2D is a schematic cross-sectional view of a flexible bladder which may be incorporated into an actuator in accordance with another embodiment described herein.

Referring to FIG. 2D, in an example of another embodiment 132 of a first enclosure, either of conductors 40, 42 may be recessed within a thickness of a corresponding wall by applying or attaching an associated first or internal insulating layer 132*n* to surfaces of the conductors 40, 42 that will face toward an interior of the enclosure 132*t* (where the dielectric fluid 34 is to be positioned), and applying or attaching a separate second, external insulating layer 132*x* to surfaces of the conductors 40, 42 facing in directions toward what will be an exterior of the first enclosure 132. If needed, one or more filler layers 132*f* may be positioned adjacent the conductors 40, 42 to occupy a space between the internal and external insulating layers 132*n*, 132*x* not occupied by the conductors 40, 42. The filler layer(s) 132*f* may have the same thickness as the conductors 40, 42 and may be formed from the same material as either of the internal and external insulating layers, or the filler layer(s) 132*f* may be formed from another suitable material. The various conductive, insulative, and filler layers may be attached to each other using adhesive bonding or any other method suitable for the purposes described herein. In one or more arrangements, each constituent layer may be molded from silicone rubber. The layers may then be attached to each other as desired using adhesive application. In other arrangements, processes such as roll-to-roll fabrication and 3D printing may be employed to form the layers. Various deposition processes may also be employed to apply metallic materials to insulative materials.

The internal insulating layer 132n may be structured (according to constituent material, application processes, etc.) to be as thin as practical while providing a sufficient level of mechanical robustness. In one or more arrangements, the thickness of the internal insulating layer 132n is in the range 500 nm-150 micrometers inclusive. In particular arrangements, the internal insulating layer 132n may have a thickness in the range 3-50 micrometers inclusive.

The thickness of the external insulating layer 132x may be specified depending on the particular application in which the actuator is to be used, and the amount of external force F1 desired to be generated by the actuator. A relatively thicker external insulating layer 132x may be relatively stiffer, thereby enabling a greater external force F1 to be transmitted by the actuator. Below a certain thickness, the external insulating layer 132x may lack the localized stiffness necessary to effectively transfer a generated force to an object to be acted on, and the external insulating layer 132x may simply expand around the object. In one or more arrangements, the external insulating layer 132x may be in the range 125 micrometers to 3 millimeters inclusive.

Referring to FIGS. 2A-2C, in one or more arrangements, any or all portions of the bladder walls which may come into contact with the dielectric fluid 34 may be covered with a protective layer 32p. The protective layer 32p may have a uniform thickness and/or composition, or the protective layer may vary in thickness or composition. Further, the protective layer 32p can be non-conductive and/or resistant to corrosion. In one or more implementations, the protective layer 32p is a flexible and corrosion resistant material, such as fluorinated ethylene propylene (FEP) or fluorinated grease. In one or more arrangements, the protective layer 32p may be in the range 5-50 micrometers inclusive.

In embodiments described herein, the bladder walls may be formed as one or more single sheets including the constituent layers and/or elements (conductors, insulating materials, etc.). The sheets may then be folded, and ends of the sheets bonded or otherwise attached together at associated seams in any of a variety of ways to form an embodiment of the bladder described herein. The sheets may be connected using any of a variety of suitable processes, depending on the constituent materials of the sheets, any size constraints, and other pertinent factors. Other methods may also be employed to fabricate the bladder.

Referring to FIGS. 1-2C, a dielectric fluid 34 may be positioned in the first enclosure interior 32t. The dielectric fluid 34 can be any suitable material. In one or more arrangements, the dielectric fluid 34 can be ethylene glycol. Additional examples of the dielectric fluid 34 include transformer oil or mineral oil. In one or more arrangements, the dielectric fluid 34 can be a lipid based fluid, such as a vegetable oil-based dielectric fluid.

The dielectric fluid 34 can have various associated properties. The dielectric fluid 34 can have an associated dielectric constant. In one embodiment, the dielectric fluid 34 can have a dielectric constant of 1 or greater, 2 or greater, 3 or greater, 4 or greater, 5 or greater, 6 or greater, 7 or greater, 8 or greater, 9 or greater, 10 or greater, 20 or greater, 30 or greater, 40 or greater, 50 or greater, or higher. In one or more arrangements, the dielectric fluid 34 can be a fluid that is resistant to electrical breakdown. In one or more arrangements, the dielectric fluid 34 can provide electrical insulating properties. In one or more arrangements, the dielectric fluid 34 can prevent arcing between surrounding conductors.

Referring to FIG. 1, the actuator may further include a receptacle 52 configured for receiving an embodiment of bladder 32 therein. Receptacle 52 may include a base 52a and at least one wall 52b extending from the base 52a so as to define a cavity 52c configured to receive the bladder 32 therein and to prevent movement of portions of the bladder from the cavity 52c past the at least one wall 52b and the base 52a, as the portions of the bladder shift responsive to forces created by application of electrical energy to the conductors 40, 42 as described herein.

"Application of electrical energy" to the conductors 40, 42 may involve any interaction between the conductors and a power source (or other element) which results in a net positive or negative charge residing on an associated one of the conductors, so that the conductors are attracted to each other or repelled by each other as described herein. For example, connection to an electrical power supply or other element may result in electrons in one of the conductors being attracted to the power supply, thereby leaving a net positive charge on this conductor.

The at least one receptacle wall 52b may be formed as a single piece with the base 52a, or the at least one wall 52b may be formed separately and attached to the base 52a using any suitable method. The at least one wall 52b may be joined to the base 52a so as to form a fluid tight seal, thereby providing a fluid-tight cavity 52c structured to prevent leakage of dielectric fluid from a seam formed between the base and wall(s) 52b, and through the base 52a or at least one wall(s) 52b.

Bladder 32 may be positioned in the receptacle 52 as shown in FIG. 1. Portions of the bladder 32 may be attached to the receptacle 52 at one or more locations so as to retain the bladder 32 within the receptacle cavity 52c, while not interfering with or restricting movement of portions of the bladder 32 responsive to forces generated by electrical charges residing on the conductors 40, 42.

Receptacle 52 or elements thereof may be formed from a polymeric material or any material or materials suitable for the purposes described herein. For example, receptacle 52 may be formed from any material having the rigidity to confine or restrict deformation of the bladder 32 to a volume of space defined by the receptacle prior to positioning of the bladder in the cavity 52c. The receptacle material may be an electrically insulative material.

An elastic membrane 38 may be attached to the receptacle wall(s) 52b. The elastic membrane 38 may completely cover and close the receptacle cavity 52c. The elastic membrane 38 may be secured to edges of the receptacle wall(s) 52b using any suitable method (for example, adhesive application). The elastic membrane 38 may be formed from a rubber or any other elastic or elastomeric material suitable for the purposes described herein.

A second enclosure 60 may be in fluid communication with the first enclosure 32. In one or more arrangements, the second enclosure 60 is defined by at least an exterior surface of the bladder 32 (such as the exterior of bladder wall 32d, for example) and the elastic membrane 38. The second enclosure may be further defined by at least a portion of the receptacle 52 (for example, wall(s) 52b). The second enclosure 60 may be in fluid communication with the first enclosure (i.e., with the interior of the bladder 32) via opening(s) 32b. During operation of the actuator as described herein, the dielectric fluid may flow from the first enclosure 32 into the second enclosure 60, and vice versa.

The first and second conductors 40, 42 may be configured to receive, retain, and/or facilitate movement of electrical charges created or deposited on the conductors by connection to a power source (not shown), such as a conventional power supply. The conductors 40, 42 may be electrically charged using wired connections to the power source, or by any other charging method suitable for the purposes described herein. Each of the conductors 40, 42 can be operatively and individually connected to a power source so as to enable the conductor to electrostatically store a net positive or negative charge. Thus, each of conductors 40, 42 may operate as an electrode which stores an associated electrical charge created thereon.

Figure 3A:
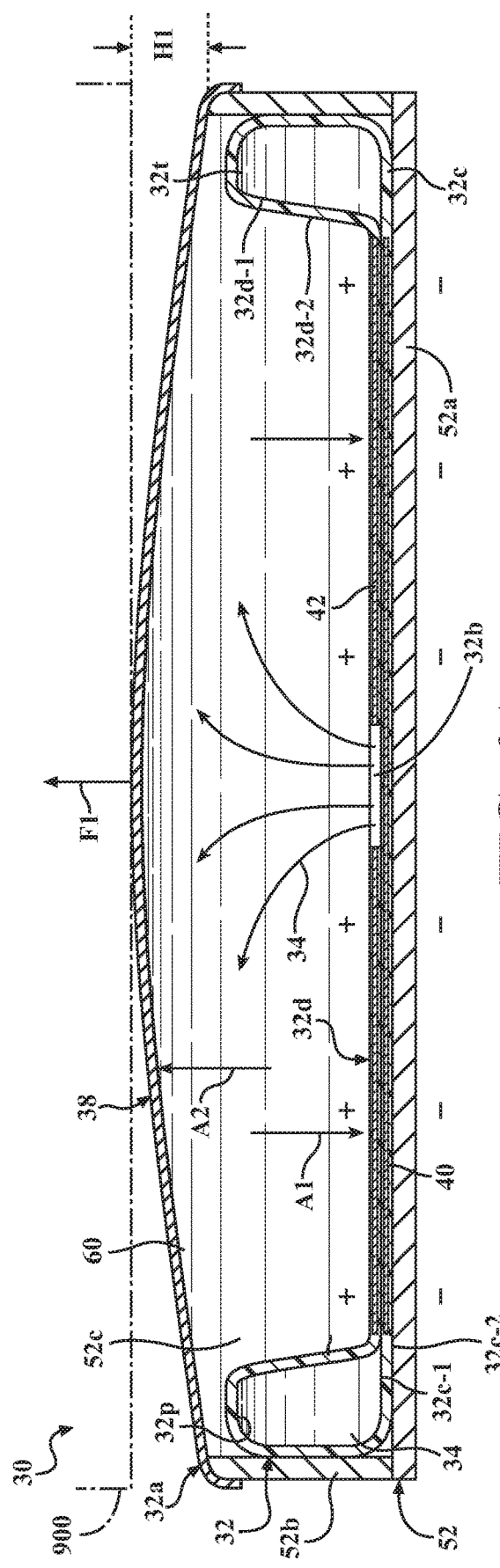
FIG. 3A is the schematic cross-sectional view of FIG. 1, showing the actuator after activation.

FIGS. 2B and 3A-3C illustrate various possible modes of operation of the actuator 30 shown in FIG. 1. FIG. 1 shows the actuator 30 in an unactivated mode, in which no power is supplied to the actuator by a power source and the conductors 40, 42 are electrically neutral (i.e., each electrode has no net charge stored thereon). Referring to FIGS. 1, 2B and 3A, to provide a first activated mode of the actuator, a connection between the actuator 30 and a power source is activated so as to provide a first application of electrical energy to the first and second conductors 40, 42. The first application of electrical energy may result in a net negative charge on one of electrodes 40, 42 and a net positive charge on the other one of electrodes 40, 42. In the example shown in FIG. 3A, the second conductor or electrode 42 has a net positive charge, while the first conductor or electrode 40 has a net negative charge. As a result, the electrodes 40 and 42 are drawn toward each other due to electrical attractive forces.

In the example shown, first bladder wall 32c is attached to receptacle base 52a to secure the bladder within the receptacle, and the remainder of the bladder 32 may be unattached to the receptacle 52, thereby permitting it to move freely within the receptacle responsive to forces exerted on the bladder 32 by the charged electrodes 40, 42 and the flow of dielectric fluid 34. Thus, in the example shown, the second bladder wall 32d may move toward the first bladder wall 32c in direction A1 due to electrical attraction between the electrodes 40, 42 to which the walls are operatively connected. As the flexible bladder walls squeeze together or toward each other, the size of the first enclosure 32 may diminish, while the size of the second enclosure 60 increases.

As seen in FIG. 3A, as the bladder walls 32c, 32d approach each other, dielectric fluid 34 may be pressurized and squeezed out of the first enclosure 32, through the bladder opening(s) 32b, and into the second enclosure 60 exterior of the first enclosure 32. Fluid flow into the second enclosure 60 produces a hydrodynamic forces acting on the elastic membrane 38 which cause an expansion of the elastic membrane in a direction A2 (i.e., in a direction away from or out of the receptacle 52). In this manner, the actuator may produce an external force F1 which may operate on an object (for example, object 900) in contact with (or within a certain distance of) the elastic membrane 38.

Alternatively, expansion of the elastic membrane 38 may be used to bring a portion of the membrane into contact with another element (for example, to establish electrical contact between a first terminal (not shown) attached to the membrane 38 and a second terminal spaced apart from the membrane 38 when the actuator is in an unactivated state). In one or more arrangements, a portion of the outer surface of the membrane 38 may be configured to expand to a distance H1 beyond a position of the portion of the outer surface when the actuator is in an unactivated state.

"Expansion of the elastic membrane" or an "expanded state" of the elastic membrane refers to a state in which the membrane 38 is stretched or deformed from its state in an unactivated condition of the actuator as shown in FIG. 1, by a flow of dielectric fluid from the first enclosure 32 into the second enclosure 60. As seen in FIG. 3A, this fluid flow produces a pressure on the elastic membrane 38, causing the membrane to stretch generally in the direction A2.

FIG. 3B is a schematic cross-sectional view of the actuator 30 of FIG. 3A after removal of the first application of electrical energy, and when the net charges on the electrodes 40, 42 in FIG. 3A have been discharged or neutralized. Referring to FIG. 3B, the actuator 30 may be configured such that, when the electrodes are no longer charged and the electrical attractive force between the electrodes are no longer present, the combination of forces exerted by the stretched elastic membrane 38 and hydrostatic pressure exerted by the dielectric fluid 34 is sufficient to force the fluid back through the opening(s) 32b, from the second enclosure 60 into the first enclosure 32. Flow of fluid from the second enclosure 60 into the first enclosure 32 inflates the first enclosure 32 while simultaneously lowering or contracting the elastic membrane 38. The elastic membrane may contract back to the state shown in FIG. 1.

FIG. 3C shows operation of the actuator 30 of FIGS. 3A and 3B in another mode. In this operational mode, to facilitate more rapid transfer of dielectric fluid from the second enclosure 60 back into the first enclosure 32, a second application of electrical energy to the first and second conductors 40, 42 may produce a repulsive force between the first conductor and the second conductor. For example, the conductors 40, 42 may both be charged with like net charges (for example, net positive charges as shown). The repulsive forces generated may urge the first conductor 40 and the second conductor 42 away from each other so as to apply pressure to the dielectric fluid 34 residing in the second enclosure 60. This pressure applied to the dielectric fluid 34 may urge the fluid to flow from the second enclosure 60 into the first enclosure 32.

FIGS. 4A-5B are schematic cross-sectional views of alternative embodiments 430, 530 of the actuator. The actuator embodiment 430 shown in FIGS. 4A-4B may have the same structure as the actuator embodiment 30 described previously, with the addition of a rigid cover 401 attached to the receptacle so as to overlie or be positioned over at least a portion of the receptacle cavity 52c and the elastic membrane 38. The rigid cover 401 is configured to prevent expansion of a portion of the elastic membrane 38 covered by the rigid cover outside the receptacle cavity 52c. The rigid cover 401 may include an opening 401a formed therein and configured to channel the expansion of the elastic membrane 38 therethrough when the flow of the dielectric fluid 34 into the second enclosure 60 produces an expansion of the elastic membrane 38 as previously described.

FIG. 4A shows the actuator 430 prior to activation. When the actuator is brought to an activated state (FIG. 4B) by application of unlike charges to the electrodes 40, 42 as previously described, the dielectric fluid 34 in the first enclosure 32 is pressurized and flows through the bladder opening 32b into the second enclosure 60. This produces a force tending to expand the elastic membrane 38. Expansion of a portion of the elastic membrane 38 in a direction away from the cavity 52c may be constrained and prevented by the rigid cover 401. However, the opening 401a in the rigid cover 401 may permit expansion of another portion 38z of the elastic membrane 38 through the opening. This arrangement may channel or focus the expansion of the elastic membrane 38 to a particular region of the actuator 430 or in a particular direction, while also increasing the distance H2 to which the elastic membrane 38 may expand beyond its unactivated state (i.e., the distance H2 may be greater than the distance H1 previously described because the elastic membrane expansion is focused and confined to a particular region, rather than being spread over substantially the entire surface of the elastic membrane 38). Deactivation or discharging of the electrodes 40, 42 and subsequent movement of the dielectric fluid 34 from the second enclosure 60 back into the first enclosure 32 may be as previously described.

Figure 5A:
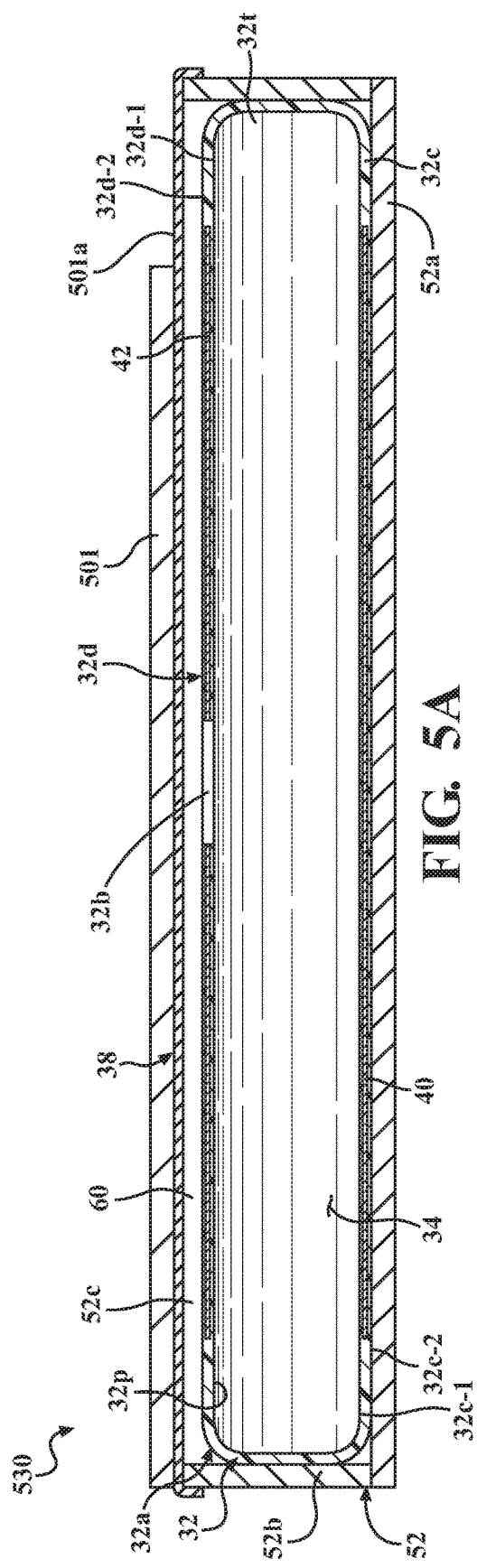
FIG. 5A is a schematic cross-sectional view of an actuator in accordance with another embodiment described herein, in an unactivated mode.
Figure 5B:
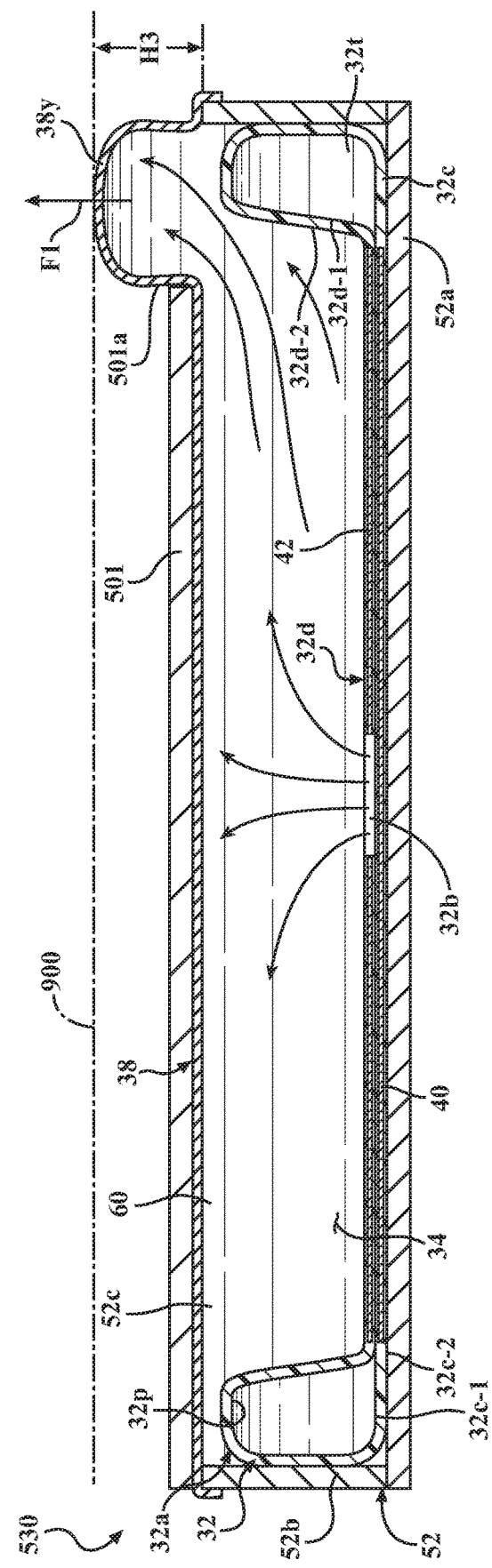
FIG. 5B is the schematic cross-sectional view of FIG. 5A showing the actuator in an activated mode.

The actuator embodiment 530 shown in FIGS. 5A-5B may have the same structure and operation as the embodiment 430 described previously, with the substitution of a different rigid cover design 501 attached to the receptacle so as to overlie at least a portion of the receptacle cavity and the elastic membrane. In this embodiment, the cover opening may reside adjacent one of the receptacle walls 52b so that a portion of the cover opening 501a is bounded by the receptacle wall(s) 52b. Thus, in the manner just described, the location of the rigid cover opening 501a may be positioned so as to focus or localize the force exerted by the actuator 530, by permitting a specific portion 38y of the elastic membrane 38 to extend through the opening 501a to a distance H3 beyond its unactivated state.

In one or more arrangements, the dimensions of the cover opening 501a and other pertinent parameters (such as the stiffness of the elastic membrane 38) may be controlled to vary the distance H3 to which the elastic membrane 38 may expand beyond its unactivated state. For example, in the embodiment shown in FIGS. 5A and 5B, increasing the size of the cover opening 501a may increase the area over which the portion of the elastic membrane 38 extends horizontally (i.e., parallel to the plane of the cover 501) through the opening 501a, while reducing the vertical distance H3 to which the elastic membrane 38 may expand beyond its unactivated state. Conversely, decreasing the size of the cover opening 501a may decrease the area over which the portion of the elastic membrane 38 extends horizontally through the opening 501a, while increasing the vertical distance H3 to which the elastic membrane 38 may expand beyond its unactivated state. In this manner, the distance H3 to which the elastic membrane 38 may expand beyond its unactivated state may be controlled by application of a cover 501 having a suitable size of cover opening 501a.

Figure 6:
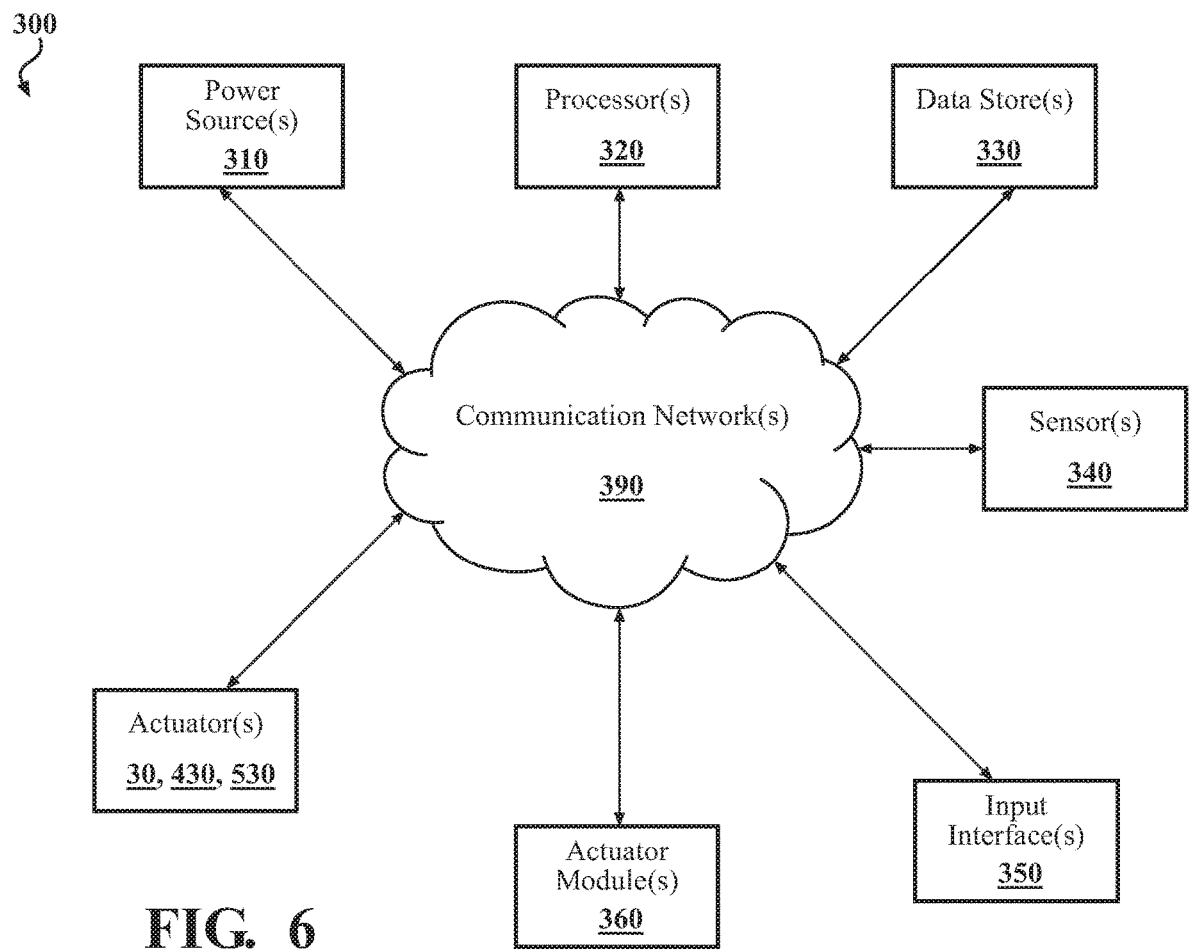
FIG. 6 is an example of an actuator system incorporating one or more actuators in accordance with one or more embodiments described herein.

Referring now to FIG. 6, a system 300 that includes one or more of the actuators 30, 430, 530 (or another embodiment of the actuator) is shown. Some of the possible elements of the system 300 are shown in FIG. 6 and will now be described. The system 300 can include one or more power sources 310, one or more processors 320, one or more data stores 330, one or more sensors 340, one or more input interfaces 350, one or more actuator modules 360, and/or one or more actuators 30. These various components can be operatively connected to each other in any suitable manner.

It will be understood that it is not necessary for the system 300 to have all of the elements shown in FIG. 6 or described herein. The system 300 can have any combination of the various elements shown in FIG. 6. Further, the system 300 can have additional elements to those shown in FIG. 6. In some arrangements, the system 300 may not include one or more of the elements shown in FIG. 6. Further, the elements of the system 300 may be physically separated by large distances. It should be appreciated that although particular elements are separately defined, each or any of the elements or portions thereof may be otherwise combined or segregated via hardware and/or software.

The various components of the system 300 can be communicatively linked through one or more communication networks, such as network 390. As used herein, the term "communicatively linked" can include direct or indirect connections through a communication channel or pathway or another component or system. A "communication network" means one or more components designed to transmit and/or receive information from one source to another. One or more of the elements of the system 300 can include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network further can be implemented as or include one or more wireless networks, whether short or long range. For example, in terms of short range wireless networks, the communication network can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network can include a mobile, cellular, and or satellite-based wireless network and support voice, video, text, and/or any combination thereof. Examples of long range wireless networks can include GSM, TDMA, CDMA, WCDMA networks or the like. The communication network can include wired communication links and/or wireless communication links. The communication network can include any combination of the above networks and/or other types of networks. The communication network can include one or more routers, one or more switches, one or more access points, one or more wireless access points, one or more transmitters, one or more receivers, one or more transceivers, and/or the like.

As noted above, the system 300 can include one or more power sources 310. The power source(s) 310 can be any power source capable of energizing and/or configured to energize the actuator. For example, the power source 310 can include one or more batteries, one or more fuel cells, one or more generators, one or more alternators, one or more solar cells, and combinations thereof. The power source(s) 310 can be configured to selectively charge and/or discharge the conductors 40, 42 for the purposes described herein.

The system 300 can include one or more processors 320. "Processor" means any component or group of components that are configured to execute any of the processes described herein or any form of instructions to carry out such processes or cause such processes to be performed. The processor(s) 320 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 320 can include at least one hardware circuit (e.g., an integrated circuit) configured to carry out instructions contained in program code. In arrangements in which there is a plurality of processors 320, such processors can work independently from each other or one or more processors can work in combination with each other.

The processor(s) 320 can be operatively connected to control the charging or energization of the conductors, and/or to control the flow of electrical energy between the power source(s) 310 other element(s) of the system 300. The processor(s) 320 can selectively adjust the flow of electrical energy between the power source(s) 310 and the actuator(s) 30, so as to activate and/or deactivate one or more actuators. Control and/or adjustment of the flow of electrical energy can be performed responsive to user inputs (e.g., via the input interface(s) 350) and/or to automatic inputs (e.g., via the sensor(s) 340, the actuator module(s) 360, etc.).

The system 300 can include one or more data stores 330 for storing one or more types of data. The data store(s) 330 can include volatile and/or non-volatile memory. Examples of suitable data stores 330 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 330 can be a component of the processor(s) 320, or the data store(s) 330 can be operatively connected to the processor(s) 320 for use thereby.

The system 300 can include one or more sensors 340. "Sensor" means any device, component and/or system that can detect, determine, assess, measure, quantify, acquire, and/or sense something, directly or indirectly. The sensor(s) 340 can be configured to detect, determine, assess, measure, quantify and/or sense information in real-time. As used herein, the term "real-time" means a level of processing responsiveness that a user or system senses as sufficiently immediate for a particular process or determination to be made, or that enables the processor to keep up with some external process. In arrangements in which the system 300 includes a plurality of sensors 340, the sensors 340 can work independently from each other or one or more of the sensors can work in combination with each other.

The system 300 can include one or more input interfaces 350. An "input interface" includes any device, component, system, element or arrangement or groups thereof that enable information, data, instructions, and/or commands to be entered into a machine. The input interface(s) 350 can be configured to receive an input from a user. The input interface(s) 350 can include one or more user interface elements, including, for example, keypad(s), display(s), touch screen(s), multi-touch screen(s), button(s), switch(s), dial(s), joystick(s), a mouse/mice, trackball(s), microphone(s), and/or combinations thereof. In one or more arrangements, the input interface(s) 350 can be configured to receive user inputs relating to the actuators(s) 30. In one or more arrangements, the input interface(s) 350 can be configured to receive user inputs relating to the actuator(s) 30 as well as to other things.

The system 300 can include one or more actuators 30, 430, 530 as described above. The one or more actuators 30, 430, 530 can be used for various purposes. In addition to the actuator(s) 30, 430, 530 described herein, the system 300 may also include other types of actuators, such as motors, pneumatic actuators, hydraulic pistons, relays, solenoids, and/or piezoelectric actuators, just to name a few possibilities.

The system 300 can include one or more modules, at least some of which will be described herein. The modules can be implemented as computer readable program code that, when executed by a processor, implement one or more of the various processes described herein. One or more of the modules can be a component of the processor(s) 320, or one or more of the modules can be executed on and/or distributed among other processing systems to which the processor(s) 320 is operatively connected. The modules can include instructions (e.g., program logic) executable by one or more processor(s) 320. Alternatively or in addition, one or more data stores 330 may contain such instructions. In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein.

The system 300 can include one or more actuator modules 360. The actuator module(s) 360 can be configured to detect and/or determine when the actuator(s) 30, 430, 530 should be activated. Such detection and/or determination can be performed based on inputs, conditions, and/or events. As an example, the actuator module(s) can detect inputs on the input interface(s) indicating that activation of the actuator(s) 30, 430, 530. For instance, a user may engage a user interface element dedicated to the actuator(s) 30, 430, 530. Alternatively, the actuator module(s) can determine that the actuator(s) 30, 430, 530 should be activated based on the conditions or events, as detected by one or more of the sensors 340. The actuator module(s) 360 can be configured to control activation of the actuator(s) 30, 430, 530 by the power source(s) 310.

Referring now to FIGS. 7 and 8A-10B, a plurality of individually operable actuators (such as actuators 30, 430, 530 described herein) may be arranged so as to form, in combination, an actuatable surface 601 operable to exert one or more forces on an object 900 in contact with the surface. All of the actuators forming a given surface 601 may be activated or energized simultaneously. Alternatively, depending on the application, selected actuators of the plurality of actuators forming a given surface may be activated, for example to focus the application of forces at corresponding selected locations, or because activation of all the available actuators may not be required in a given situation.

Figure 7:
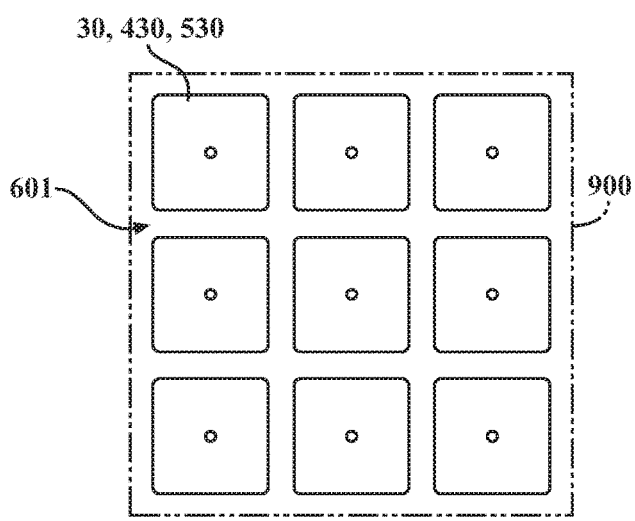
FIG. 7 is a schematic plan view of a plurality of individually operable actuators as described herein arranged into an actuatable array or surface.

The plurality of individually operable actuators may be part of as system such as system 300 previously described. FIG. 7 is a schematic plan view of a plurality of individually operable actuators in accordance with one of the embodiments 30, 430, 530 described herein, arranged into an actuatable array or surface 601. The actuators shown in FIG. 7 may be any of the types of actuators previously described herein, or the actuators may be different types of actuators having characteristics similar to those described herein.

FIGS. 8A and 8B are schematic side views of an actuatable surface comprising actuators 30, 30', 30" as shown in FIGS. 3A-3C, before activation of the actuators (FIG. 8A) and after activation of the actuators (FIG. 8B). As shown, each of actuators 30, 30', 30" may generate an associated force (forces F1, F1', F1") which may operate on an object in contact with (or in sufficient proximity to) the actuators.

Figure 9A:
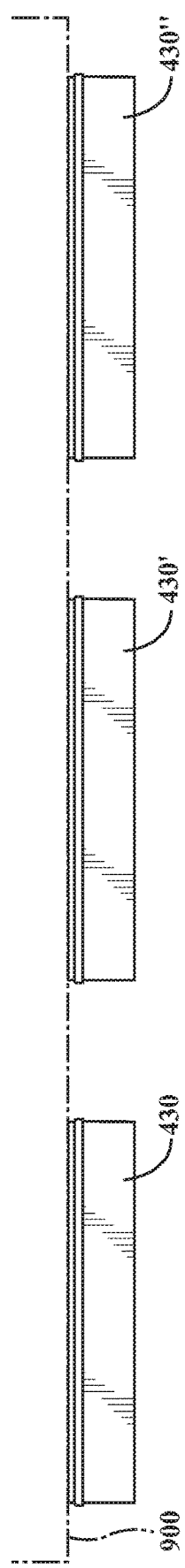
FIG. 9A is a schematic side view of an actuatable surface comprising actuators as shown in FIGS. 4A-4C, before activation of the actuator.
Figure 9B:
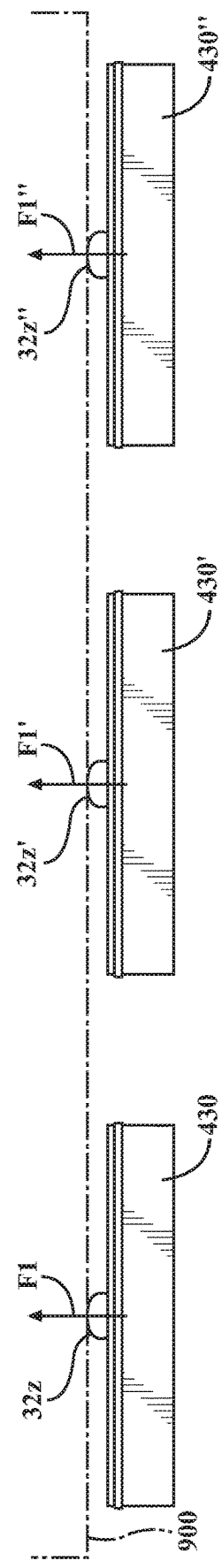
FIG. 9B is the schematic side view of FIG. 9A showing the actuators after activation, with each actuator applying an associated force to an object.

FIGS. 9A and 9B are schematic side views of an actuatable surface comprising actuators 430, 430', 430" as shown in FIGS. 4A-4B, before activation of the actuators (FIG. 9A) and after activation of the actuators (FIG. 9B). As shown, each actuator 430, 430', 430" may generate an associated force (forces F1, F1', F1") which may operate on an object in contact with (or in sufficient proximity to) the actuators.

Figure 10A:
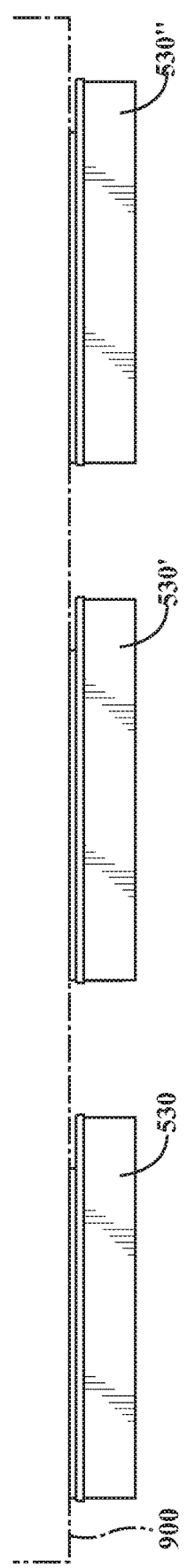
FIG. 10A is a schematic side view of an actuatable surface comprising actuators as shown in FIGS. 5A-5C, before activation of the actuator.
Figure 10B:
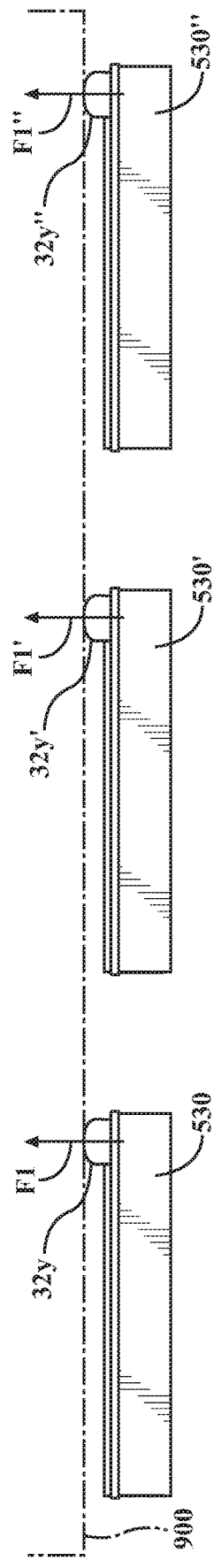
FIG. 10B is the schematic side view of FIG. 10A showing the actuators after activation, with each actuator applying an associated force to an object.

FIGS. 10A and 10B are schematic side views of an actuatable surface comprising actuators 530, 530', 530" as shown in FIGS. 5A-5B, before activation of the actuators (FIG. 10A) and after activation of the actuators (FIG. 10B). As shown, each actuator 530, 530', 530" may generate an associated force (forces F1, F1', F1") which may operate on an object in contact with (or in sufficient proximity to) the actuators.

Actuators described herein can be used in various applications, including in vehicular and non-vehicular applications. It will be appreciated that arrangements described herein can provide numerous benefits, including one or more of the benefits mentioned herein. For example, arrangements described herein can providing an actuator with a central fluid chamber that is normally in a pinched condition. Thus, power does not need to be supplied to the actuator to attain and maintain the pinched condition, thereby saving energy.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods and/or operations described herein is suited. A typical combination of hardware and software can be a processing system with computer-usable program code that, when being loaded and executed, controls the processing system such that it carries out the methods and/or operations described herein. The systems, components and/or processes also can be embedded in a computer-readable storage, such as a computer program product or other data programs storage device, readable by a machine, tangibly embodying a program of instructions executable by the machine to perform methods and/or operations described herein. These elements also can be embedded in an application product which comprises all the features enabling the implementation of the methods described herein and, which when loaded in a processing system, is able to carry out these methods.

Furthermore, arrangements and/or operations described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. An actuator comprising:
a first enclosure;
a dielectric fluid positioned in the first enclosure;
a second enclosure in fluid communication with the first enclosure;
an elastic membrane defining at least a portion of the second enclosure;
a first electrical conductor positioned along a first side of the first enclosure; and
a second electrical conductor positioned along a second side of the first enclosure opposite the first side and spaced apart from the first conductor, the first conductor and the second conductor being configured to receive electrical energy from a power source, the actuator being configured such that a first application of electrical energy to the first and second conductors produces an attractive force between the first conductor and the second conductor, drawing the first conductor and the second conductor toward each other,
wherein motion of the first conductor and the second conductor toward each other pressurizes the dielectric fluid in the first enclosure so as to force the dielectric fluid to flow from the first enclosure into the second enclosure, and wherein the flow of the dielectric fluid into the second enclosure exerts a force on the elastic membrane which expands the elastic membrane.

2. The actuator of claim 1 wherein the actuator is configured such that, upon removal of the first application of electrical energy to the first and second conductors, a force exerted by the elastic membrane in an expanded state on the dielectric fluid in the second enclosure urges the dielectric fluid to flow from the second enclosure into the first enclosure.

3. The actuator of claim 1 wherein the actuator is configured such that, upon removal of the first application of electrical energy to the first and second conductors, a force exerted on an exterior of the elastic membrane urges the dielectric fluid to flow from the second enclosure and into the first enclosure.

4. The actuator of claim 1 wherein the actuator is configured such that a second application of electrical energy to the first and second conductors produces a repulsive force between the first conductor and the second conductor, urging the first conductor and the second conductor away from each other so as to apply pressure to a dielectric fluid residing in the second enclosure, and wherein the pressure applied to the dielectric fluid urges the dielectric fluid to flow from the second enclosure into the first enclosure.

5. The actuator of claim 1 wherein the first enclosure comprises a bladder having a casing formed from a flexible, fluid-impermeable material, the casing having at least one opening formed therein and enabling fluid communication between the first enclosure and the second enclosure, wherein the casing has a first wall defining the first side of the first enclosure, and wherein the casing has a second wall opposite the first wall and defining the second side of the first enclosure.

6. The actuator of claim 5 wherein the at least one opening extends through the second side of the first enclosure.

7. The actuator of claim 6 wherein the at least one opening extends through the second conductor.

8. The actuator of claim 5 further comprising a receptacle including a base and at least one wall extending from the base so as to define a cavity configured to receive the bladder therein and to prevent movement of the bladder from the cavity past the at least one wall and the base.

9. The actuator of claim 8 wherein the second enclosure is defined by at least an exterior surface of the bladder and the elastic membrane.

10. The actuator of claim 9 wherein the second enclosure is further defined by at least a portion of the receptacle.

11. The actuator of claim 8 further comprising a rigid cover positioned over at least a portion of the cavity so as to prevent expansion of a portion of the elastic membrane covered by the rigid cover outside the cavity, the rigid cover including an opening formed therein, the opening being configured to channel the expansion of the elastic membrane therethrough when the flow of the dielectric fluid into the second enclosure produces an expansion of the elastic membrane.

12. The actuator of claim 1 further comprising a first insulating layer interposed between the first electrical conductor and the second electrical conductor so as to prevent direct physical contact between the first electrical conductor and the second electrical conductor.

13. The actuator of claim 12 further comprising a second insulating layer interposed between an exterior of the first enclosure and at least one of the first electrical conductor and the second electrical conductor.

14. The actuator of claim 13 wherein the first and second insulating layers are formed from the same material and form a continuous structure encapsulating the at least one of the first conductor and the second conductor.

15. A surface operable to exert a force on an object in contact with the surface, the surface comprising a plurality of individually operable actuators, each actuator of the plurality of actuators being configured in accordance with claim 1.

16. A system comprising:
    at least one actuator including a first enclosure, a dielectric fluid positioned in the first enclosure, a second enclosure in fluid communication with the first enclosure, an elastic membrane defining at least a portion of the second enclosure, a first electrical conductor positioned along a first side of the first enclosure, a second electrical conductor positioned along a second side of the first enclosure opposite the first side and spaced apart from the first conductor, the first conductor and the second conductor being configured to receive electrical energy from a power source;
    a power source operatively connected to supply electrical energy to first conductor and the second conductor; and
    one or more processors operatively connected to selectively control a supply of electrical energy from the power source to the actuator,
    the actuator being configured such that a first application of electrical energy to the first and second conductors produces an attractive force between the first conductor and the second conductor, drawing the first conductor and the second conductor toward each other,
    wherein motion of the first conductor and the second conductor toward each other pressurizes the dielectric fluid in the first enclosure so as to force the dielectric fluid to flow from the first enclosure into the second enclosure, and wherein the flow of the dielectric fluid into the second enclosure exerts a force on the elastic membrane which expands the elastic membrane.

17. The system of claim 16, wherein the power source is configured to supply electrical energy to the first and second conductors such that the first and second conductors have unlike charges, such that the first conductor and the second conductor are attracted to each other when a first application of electrical energy is supplied to the first conductor and the second conductor.

18. The system of claim 16, wherein the power source is configured to supply electrical energy to the first and second conductors such that the first and second conductors have like charges, such that the first conductor and the second conductor repel away from each other when a second application of electrical energy is supplied to the first conductor and the second conductor.

19. The system of claim 16, further including an input interface, whereby the supply of electrical energy from the power source to the actuator is controllable by inputs received via the input interface.

20. The system of claim 16, further including one or more sensors operatively connected to the one or more processors, whereby the supply of electrical energy from the power source to the actuator is controllable based on sensor data acquired by the one or more sensors.

\* \* \* \* \*